United States Patent
Bass et al.

(10) Patent No.: US 7,450,626 B1
(45) Date of Patent: Nov. 11, 2008

(54) LASERS THAT OPERATE INDEPENDENTLY OF TEMPERATURE

(75) Inventors: Michael Bass, Indian River Shores, FL (US); Alexandra Rapaport, Hem (FR); Stephan Fahr, Jena (DE); John Koroschetz, Orlando, FL (US); Brian Brickeen, Apopka, FL (US)

(73) Assignees: University of Central Florida Research Foundation, Inc., Orlando, FL (US); Northrop Grumman Corp., Winter Park, FL (US)

( * ) Notice: Subject to any disclaimer, the term of this patent is extended or adjusted under 35 U.S.C. 154(b) by 0 days.

(21) Appl. No.: 11/655,495

(22) Filed: Jan. 19, 2007

Related U.S. Application Data (60) Provisional application No. 60/762,927, filed on Jan. 27, 2006.

(51) Int. Cl.
*H01S 5/00* (2006.01)
*H01S 3/08* (2006.01)

(52) U.S. Cl. .................................. 372/102; 372/50.11

(58) Field of Classification Search .................. 372/32, 372/33, 50.11, 102
See application file for complete search history.

(56) References Cited

U.S. PATENT DOCUMENTS

| | | | | |
|---|---|---|---|---|
| 5,926,778 | A * | 7/1999 | Poppel | 702/130 |
| 6,061,170 | A * | 5/2000 | Rice et al. | 359/345 |
| 6,586,141 | B1 | 7/2003 | Efimov et al. | 430/1 |
| 6,673,497 | B2 | 1/2004 | Efimov et al. | 430/1 |
| 6,897,999 | B1 | 5/2005 | Bass et al. | 359/326 |
| 7,095,772 | B1 | 8/2006 | Delfyett et al. | 372/50.22 |
| 2005/0207466 | A1 * | 9/2005 | Glebov et al. | 372/92 |

OTHER PUBLICATIONS

M. Bass, L. Weichmann, S. Vigil, and B. Brickeen, "The temperature dependence of $Nd_{3+}$ doped solid-state lasers," IEEE Journal of Quantum Electronics, vol. 39, pp. 741-748, 2003.

Te-yuan Chung, V. Smirnov, M. Hemmer, L.B. Glebov, M.C. Richardson, and M. Bass, "Unexpected properties of a laser resonator with volumetric Bragg grating end mirrors," paper CFB5, CLEO/WELS, Long Beach, CA, (2006) 4 pgs.

T. Chung, A. Rapaport, Y.Chen, V. Smirnov, M. Hemmer, L.B. Glebov, M.C. Richardson and M. Bass, "Spectral narrowing of solid state lasers by narrow-band PTR Bragg mirrors," paper CREOL, College of Optics and Photonics, Uni, Central Florida, 10 pgs, 2006.

(Continued)

*Primary Examiner*—Armando Rodriguez
(74) *Attorney, Agent, or Firm*—Brian S. Steinberger; Phyllis K. Wood; Law Offices of Brian S. Steinberger, P.A.

(57) ABSTRACT

Apparatus, methods, systems and devices for providing a temperature independent laser by determining a temperature dependence of a lasing wavelength, selecting the lasing wavelength having minimal temperature dependence and constraining the lasing wavelength of the laser device to the selected lasing wavelength. In an embodiment, a volumetric Bragg grating in photo-thermal refractive glass is used as a laser cavity mirror for constraining the laser emission at the selected wavelength. The laser device may be a broad spectrum laser such as an $Er^{3+}$ doped glass broad spectrum laser. In an embodiment, the lasers are operated where the temperature dependence of the stimulated emission cross section is used to compensate for temperature dependent changes of other laser components.

35 Claims, 4 Drawing Sheets

OTHER PUBLICATIONS

T. Chung, A. Rapaport, Y. Chen, V. Smirnov, L.B. Glebov, M.C. Richardson, M. Bass, "Stabilization, spectral narrowing and optimization of solid state lasers using volumetric PTR Bragg grating cavity mirrors." Paper, CREOL, College of Optics and Photonics, Uni, Central Florida, SSDLTR (2006) 5 pgs.

Igor V. Ciapurin, L.B. Glebov, Vadim I. Smirnov, "Modeling of phase volume diffractive gratings, part 1: transmitting sinusoidal uniform gratings," Optical Engineering, vol. 45 (1), 015802, Jan. 2006, 9 pages.

P.F. McManamon, E.A. Watson, "Nonmechanical Beam Steering for Passive Sensors," Proceeding of SPIE, vol. 4369, 2001, pp. 140-148.

P.F. McManamon, Jianru Shi, P.J. Bos, "Broadband optical phased-array beam steering," Optical Engineering, vol. 44 (12), Dec. 2005, 5 pages.

L.B. Glebov, V.I. Smirnov, C.M. Stickley, I.V. Ciapurin, "New approach to robust optics for HEL systems," Proceedings of SPIE, vol. 4724, 2002, pp. 101-109.

\* cited by examiner

LASERS THAT OPERATE INDEPENDENTLY OF TEMPERATURE

This application claims the benefit of priority to U.S. Provisional Patent Application No. 60/762,927 filed on Jan. 27, 2006.

FIELD OF THE INVENTION

This invention relates to lasers and, in particular, to methods, systems, apparatus and devices for lasers that operate independent of temperature for use with range finders, target designators, laser radars and the like.

BACKGROUND AND PRIOR ART

Solid state lasers are commonly used in field applications where the operating temperature may vary from minus 50° C. to plus 50° C. However, the stimulated emission cross section of the laser material depends on the temperature as described in M. Bass, L. Weichman, S. Vigil, and B. Brickeen, "The temperature dependence of $Nd^{3+}$ doped solid-state lasers," IEEE Journal of Quantum Electronics, vol. 39, pp. 741-748, (2003). Therefore, long pulse and active/passive Q-switched solid state lasers are temperature dependent. It has been assumed that the reflectivity of the mirrors in the laser resonators were independent of temperature since the laser mirrors are typically dielectric coatings and do not show a change in reflectivity with temperature in the range of approximately minus 50° C. and approximately plus 50° C. The only temperature dependent quantity in the output energy of the laser was considered to be the stimulated emission cross section.

Typically, prior art broad spectrum lasers were operated at the peak of the emission spectrum where the simulated emission cross section is the largest. These lasers vary dramatically in output as the operating temperature changes. The variations in output due to temperature make the temperature dependent lasers useless for applications in which the laser is operated in different climatic environments.

What is needed is a broad spectrum laser operating at wavelengths that are selected for temperature independent operation to solve this problem.

SUMMARY OF THE INVENTION

A primary objective of the invention is to provide new methods, systems, apparatus and devices for a laser that operates over a wide range of temperature with little or no variation in performance.

A secondary objective of the invention is to provide new methods, systems, apparatus and devices for temperature independent lasers for military and commercial use.

A third objective of the invention is to provide new methods, systems, apparatus and devices for temperature independent lasers for use with range finders, target designators and laser radars.

A fourth objective of the invention is to provide new methods, systems, apparatus and devices for temperature independent, or minimally dependent, broad spectrum lasers such as $Er^{3+}$ doped glass broad spectrum laser.

A fifth objective of the invention is to provide methods, systems, apparatus and devices for reducing or eliminating the temperature dependence of broad spectrum lasers by constraining the lasing wavelength(s) to those found to have little or no temperature dependence in a simulated emission cross section.

A sixth objective of the invention is to provide methods, systems, apparatus and devices for selecting an operation wavelength to compensate for temperature dependence of other laser components.

The first embodiment of the present is a method for providing a temperature independent laser by determining a temperature dependence of a lasing wavelength, selecting the lasing wavelength having minimal temperature dependence and constraining the lasing wavelength of the laser device to the selected lasing wavelength. In an embodiment, a volumetric Bragg grating in photo-thermal refractive glass is used as a laser cavity mirror for constraining the laser emission at the selected wavelength. The laser device may be a broad spectrum laser such as an $Er^{3+}$ doped glass broad spectrum laser. In an embodiment, the operational wavelength is further selected to compensate for temperature dependence of other laser components. In another embodiment, the volume Bragg grating mirror is housed in a temperature controlled chamber to maintain optimum output coupling with a change in environmental temperatures.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The method, system, apparatus and device of the present invention provides lasers that operate over a wide range of temperature with either no or very little variation in their performance. It is known that the stimulated emission cross section which governs lasing varies with temperature which has been studied in regard to narrow spectrum lasers such as Nd:YAG and Nd:GSGG by measuring the temperature dependence of the stimulated emission cross section over a wide range of temperatures.

Figure 1:
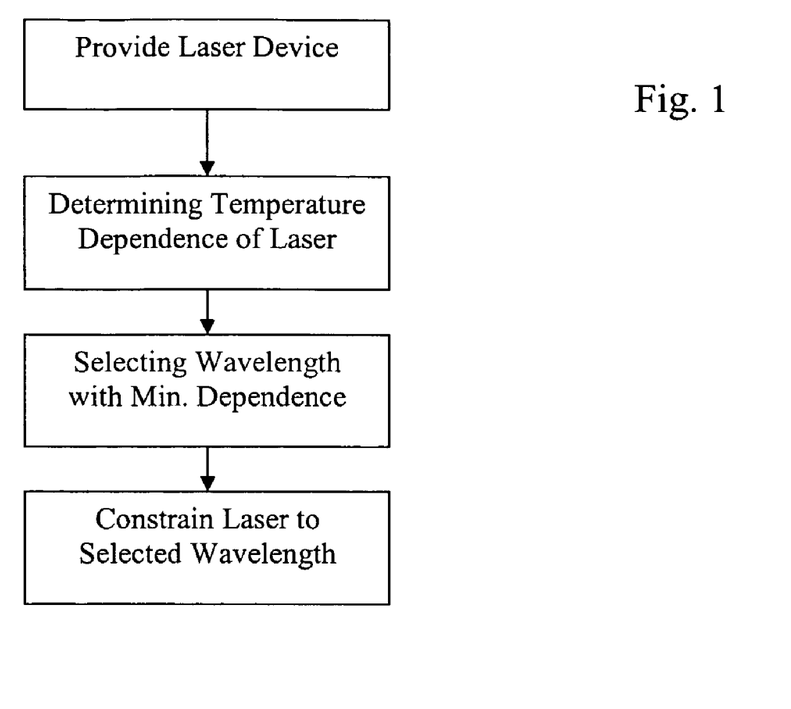
FIG. 1 is a flow diagram of the process for providing a laser that operates independent of temperature.

The apparatus, methods, systems and devices of the present invention provide laser devices for operation that is temperature independent. As shown in FIG. 1, the steps include providing a laser device for producing a laser output. The laser device may be broad spectrum laser, an $Er^{3+}$ doped glass broad spectrum laser, an $Er^{3+}$ emitter co-doped with $Yb^{3+}$ in a glass, a $Yb^{3+}$ doped glass broad spectrum laser or a $Tm^{3+}$ doped glass broad spectrum laser. Alternatively, a wide spectrum laser, such as an $Er^{3+}$ emitter co-doped with $Yb^{3+}$ in a glass is selected.

Once a laser device is selected, the temperature dependence of the lasing wavelength is determined for the laser device and a lasing wavelength that has minimal temperature dependence is selected and the operation is constrained that selected lasing wavelength to reduce the temperature dependent of the laser device during operation at different environmental temperatures. In an embodiment, the selected wavelength is the wavelength at which the minimal temperature dependence is approximately zero. In another embodiment, the wavelength is selected to compensate for temperature dependence of other laser components.

Figure 2:
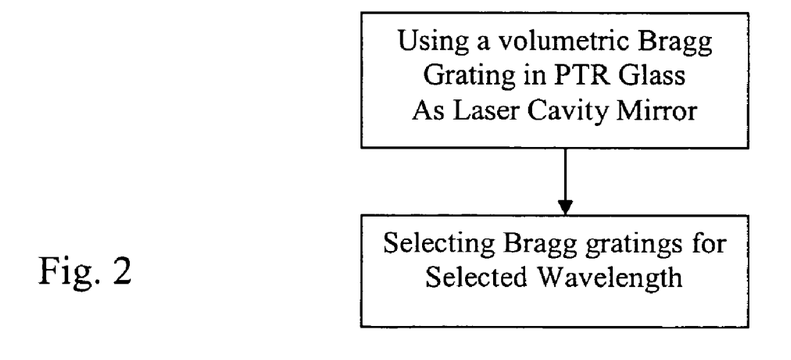
FIG. 2 is a flow diagram for constraining operation of a laser at pre-selected wavelength for temperature independent operation.

Referring to the flow diagram of FIG. 2, the constraining step includes using a volumetric Bragg grating in photo-thermal refractive glass as a laser cavity mirror for constraining the laser emission at the selected wavelength. In an embodiment, the volumetric Bragg grating in photo-thermal refractive glass is selected for operation of a broad emission spectrum laser at selected wavelengths that have minimum variation of stimulated emission cross section with temperature. Alternatively, the volumetric Bragg grating in photo-thermal refractive glass is selected for operation of the laser device where the temperature dependence of the stimulated emission cross section is used to compensate for temperature dependent changes of other laser components.

Figure 3A:
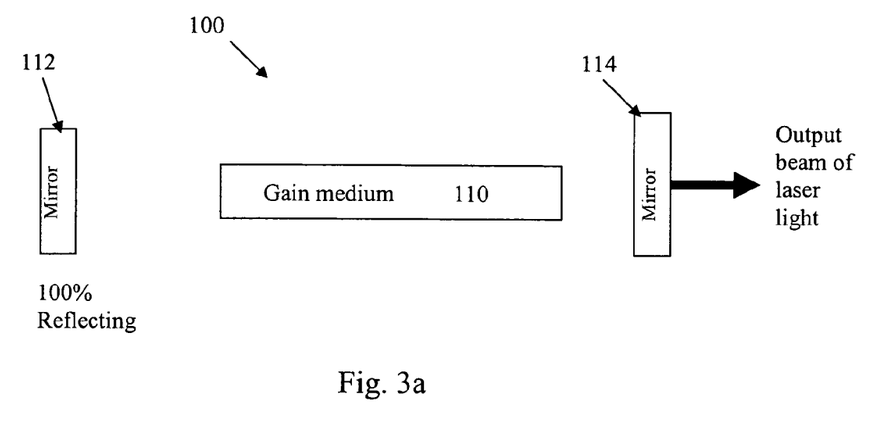
FIG. 3a is a block diagram of a common long pulse laser showing the gain medium and resonator mirrors.
Figure 3B:
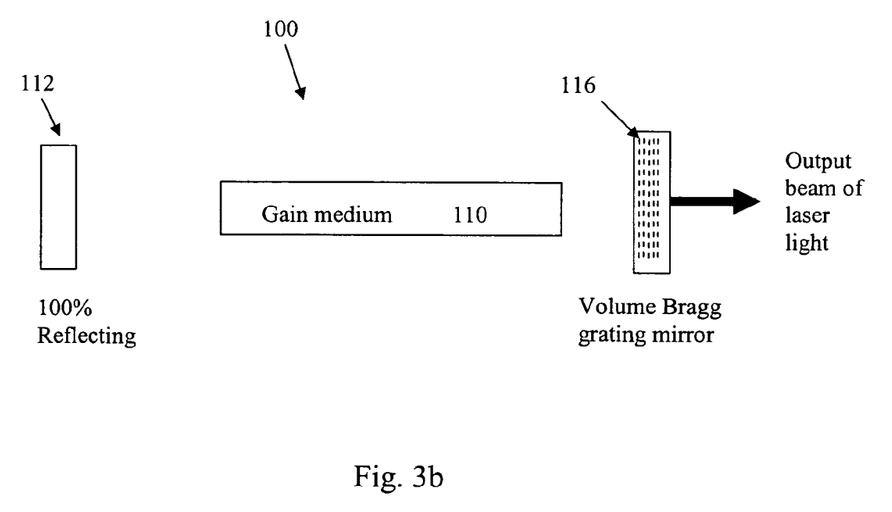
FIG. 3b is a block diagram of a long pulse laser showing the gain medium, the resonator with a reflecting mirror and a volume Bragg grating mirror.

FIG. 3a is a block diagram of a common long pulse laser 100 showing the gain medium 110 and resonator mirrors 112 and 114. The first resonator mirror 112 is a 100% reflecting mirror and the second resonator mirror is a partially reflecting mirror 114. FIG. 3b is a block diagram of a long pulse laser 100 according to the present invention showing the gain medium 110, the resonator with a reflecting mirror 112 and a volume Bragg grating mirror 116 serving as a partly reflecting mirror. The volume Bragg grating mirror 116 has a reflectivity that is dependent on temperature. The dashed lines shown on the partly reflecting volume Bragg grating mirror 116 represent the planes of the gratings.

Figure 3C:
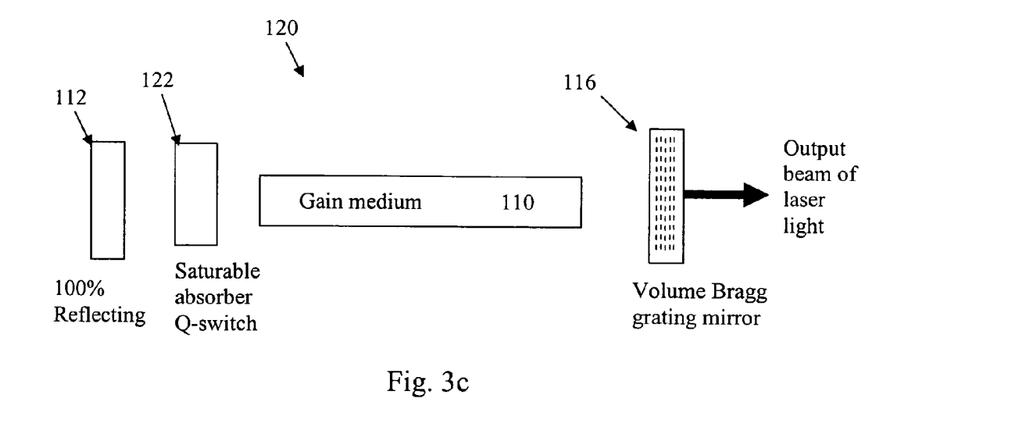
FIG. 3c shows an example of a passively Q-switched laser according to the present invention.
Figure 3D:
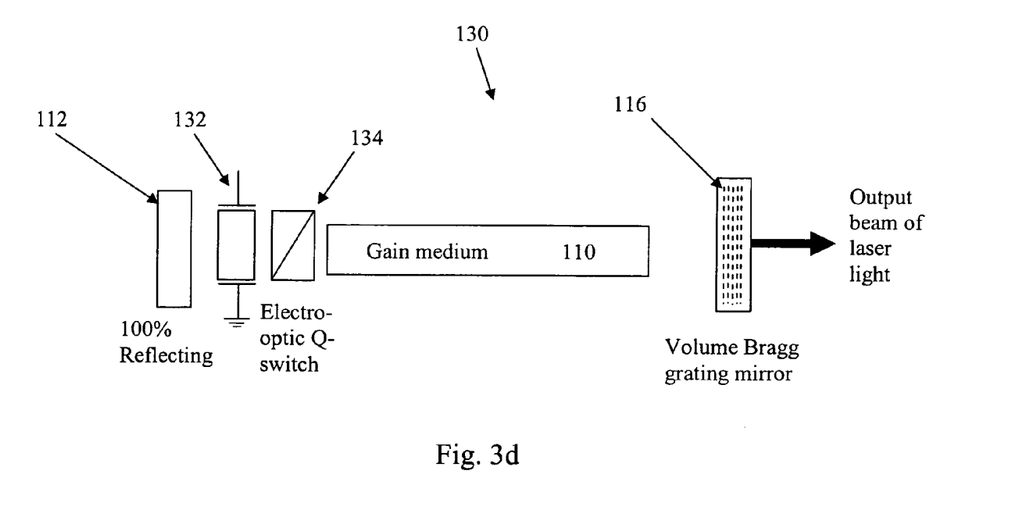
FIG. 3d shows an example of an actively Q-switched laser according to the present invention.

FIG. 3c is another block diagram of a passively Q-switched laser 120 showing the gain medium 110, the resonator 100% reflecting mirror 112, and a volume Bragg grating mirror 116 serving as the partly reflecting mirror and which has a reflectivity that is dependent on temperature and an intracavity saturable absorber passive Q-switch 122. Another example is shown in FIG. 3d, which shows an actively Q-switched laser 130 showing the gain medium 110, the resonator 100% reflecting mirror 112 and a volume Bragg grating mirror 116 serving as the partly reflecting mirror, and which has a reflectivity that is dependent on temperature, and an intracavity active Q-switch composed of a polarizing prism 134 and an electro-optic polarization rotator 132.

Figure 4:
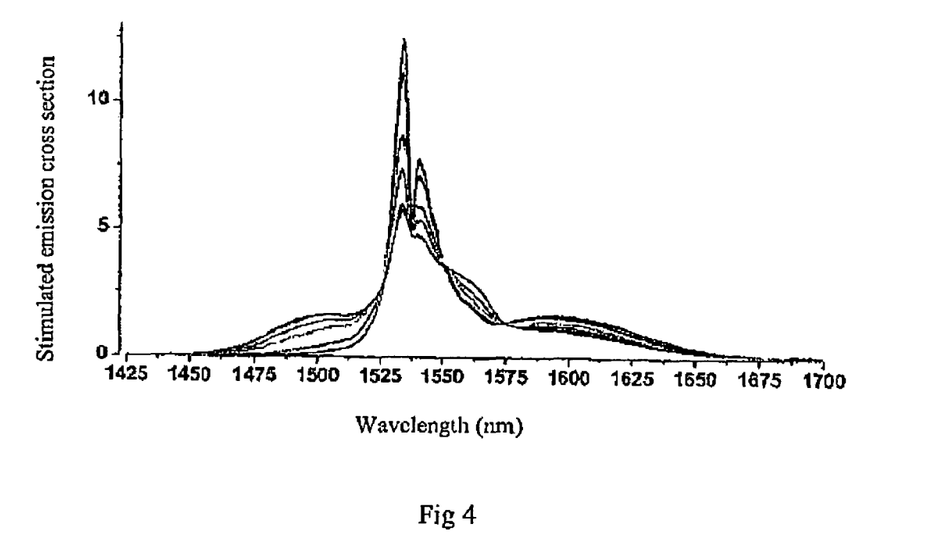
FIG. 4 is a graph showing emission cross section as a function of wavelength for a broad spectrum laser device.

In accordance with the present invention, measurements were performed for a wide spectrum laser, an $Er^{3+}$ emitter co-doped with $Yb^{3+}$ in a glass produced by Kigre Inc. called MM2. The measured total stimulated emission cross section as a function of wavelength for several temperatures is shown in FIG. 4. As shown, the peak cross section decreases with increasing temperature. The present invention takes advantage of lasing at the wavelengths in FIG. 4 where there is no change in emission cross section with temperature or where it is very much less than at the peak. These wavelengths, or wavelength ranges, are places in the spectrum where one line in the emission spectrum has a cross section that changes one way with temperature and where an adjacent line changes the other way. The result is approximately no net change or a very small change in total cross section with temperature. Lasing at these wavelengths, results in virtually temperature independent operation of the laser.

Prior art broad spectrum lasers were operated at the peak of the emission spectrum where the stimulated emission cross section was largest. These prior art lasers varied dramatically in output as the operating temperature changed. Such variation made them virtually useless for applications in which the laser will be operated in different climatic environments. In the present invention, wavelengths are selected for temperature independent operation to solve this problem.

Use of volumetric Bragg gratings in photo-thermal refractive (PTR) glass as one of the laser cavity mirrors can be used to select and hold a broad spectrum laser emission at the selected wavelength. This allows lasing to be controlled at the desired temperature independent wavelength. If a passive Q-switch or other possibly temperature dependent component is required in the laser, then a wavelength at which the temperature dependence of the lasing material compensates by changing in the appropriate manner is selected.

In summary, the present invention allows operation of broad emission spectrum lasers at wavelengths that have little or no variation of stimulated emission cross section with temperature. In another embodiment, the lasers are operated where the temperature dependence of the stimulated emission cross section is used to compensate for temperature dependent changes of other laser components.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for providing a temperature independent laser comprising the steps of:
    providing a laser device for producing a laser output;
    determining a temperature dependence of a lasing wavelength for the laser device;
    selecting an operating temperature for the lasing wavelength having minimal temperature dependence;
    using at least one volumetric Bragg grating in photo-thermal refractive glass as a laser cavity mirror for constraining the laser emission at the selected wavelength to reduce the temperature dependent of the laser device during operation at different environmental temperatures; and
    selecting the at least one volumetric Bragg grating mirror for operation of broad emission spectrum lasers at wavelengths that have little or no variation of stimulated emission cross section with temperature.

2. The method of claim 1, wherein the providing step comprises the step of:
    providing a broad spectrum laser.

3. The method of claim 2, wherein the providing step comprises the step of:
    providing an $Er^{3+}$ doped glass broad spectrum laser.

4. The method of claim 3, wherein the providing step comprises the step of:
    providing an $Er^{3+}$ emitter co-doped with $Yb^{3+}$ in a glass.

5. The method of claim 2, wherein the providing step comprises the step of:
    providing an $Yb^{3+}$ doped glass broad spectrum laser.

6. The method of claim 2, wherein the providing step comprises the step of:
provided an $Tm^{3+}$ doped glass broad spectrum laser.

7. The method of claim 1, wherein the providing step comprises the step of:
providing a wide spectrum laser.

8. The method of claim 1, wherein the providing step comprises the step of:
providing an $Er^{3+}$ emitter co-doped with $Yb^{3+}$ in a glass.

9. The method of claim 2, wherein the selecting step comprises the step of:
selecting the lasing wavelength at which the minimal temperature dependence is approximately zero.

10. The method of claim 1, wherein the selection step further comprises the step of:
selecting the lasing wavelength to compensate for temperature dependence of laser components.

11. The method of claim 1, further comprising the step of:
selecting the at least one volumetric Bragg grating mirror for operation of the laser where the temperature dependence of the stimulated emission cross section is used to compensate for temperature dependent changes of internal laser components.

12. The method of claim 1, further comprising:
housing the at least one volume Bragg grating mirror in a temperature controlled chamber to maintain optimum output coupling with a change in environmental temperatures.

13. A temperature independent laser comprising:
a lasing device for providing a laser beam having lasing wavelength selected for minimal temperature dependence; and
at least one volumetric Bragg grating in photo-thermal refractive glass as a laser cavity mirror for constraining the laser emission at the selected wavelength, the at least one volumetric Bragg grating mirror selected for operation of broad emission spectrum lasers at wavelengths that have minimum variation of stimulated emission cross section with temperature, wherein the laser operates over a wide range of temperatures with minimal variation in performance.

14. The laser of claim 13, wherein the at least one volumetric Bragg grating mirror comprises:
a volumetric Bragg grating in photo-thermal refractive glass selected for operation of the laser where the temperature dependence of the stimulated emission cross section is used to compensate for temperature dependent changes the laser.

15. The laser of claim 13, further comprising:
a temperature controlled chamber for housing the at least one volume Bragg grating mirror to maintain optimum output coupling with a change in environmental temperatures.

16. A method for providing a temperature independent laser comprising the steps of:
providing a laser device for producing a laser output;
determining a temperature dependence of a lasing wavelength for the laser device;
selecting an operating temperature for the lasing wavelength having minimal temperature dependence;
using at least one volumetric Bragg grating in photo-thermal refractive glass as a laser cavity mirror for constraining the laser emission at the selected wavelength to reduce the temperature dependent of the laser device during operation at different environmental temperatures; and selecting the at least one volumetric Bragg grating mirror for operation of the laser where the temperature dependence of the stimulated emission cross section is used to compensate for temperature dependent changes of internal laser components.

17. The method of claim 16, wherein the providing step comprises the step of:
providing a laser device selected from a group consisting of a broad spectrum laser, an $Er^{3+}$ doped glass broad spectrum laser, an $Er^{3+}$ emitter co-doped with $Yb^{3+}$ in a glass, an $Er^{3+}$ emitter co-doped with $Yb^{3+}$ in a glass, $Yb^{3+}$ doped glass broad spectrum laser and a $Tm^{3+}$ doped glass broad spectrum laser.

18. The method of claim 16, wherein the providing step comprises the step of:
providing a wide spectrum laser.

19. The method of claim 16, wherein the selecting step comprises the step of:
selecting the lasing wavelength at which the minimal temperature dependence is approximately zero.

20. The method of claim 16, wherein the selection step further comprises the step of:
selecting the lasing wavelength to compensate for temperature dependence of laser components.

21. The method of claim 16, further comprising the step of:
selecting the at least one volumetric Bragg grating mirror for operation of broad emission spectrum lasers at wavelengths that have little or no variation of stimulated emission cross section with temperature.

22. The method of claim 16, further comprising:
housing the at least one volume Bragg grating mirror in a temperature controlled chamber to maintain optimum output coupling with a change in environmental temperatures.

23. A method for providing a temperature independent laser comprising the steps of:
providing a laser device for producing a laser output;
determining a temperature dependence of a lasing wavelength for the laser device;
selecting an operating temperature for the lasing wavelength having minimal temperature dependence;
using at least one volumetric Bragg grating in photo-thermal refractive glass as a laser cavity mirror for constraining the laser emission at the selected wavelength to reduce the temperature dependent of the laser device during operation at different environmental temperatures; and
housing the at least one volume Bragg grating mirror in a temperature controlled chamber to maintain optimum output coupling with a change in environmental temperatures.

24. The method of claim 23, wherein the providing step comprises the step of:
providing a laser device selected from a group consisting of a broad spectrum laser, an $Er^{3+}$ doped glass broad spectrum laser, an $Er^{3+}$ emitter co-doped with $Yb^{3+}$ in a glass, an $Er^{3+}$ emitter co-doped with $Yb^{3+}$ in a glass, $Yb^{3+}$ doped glass broad spectrum laser and a $Tm^{3+}$ doped glass broad spectrum laser.

25. The method of claim 23, wherein the providing step comprises the step of:
providing a wide spectrum laser.

26. The method of claim 23, wherein the selecting step comprises the step of:
selecting the lasing wavelength at which the minimal temperature dependence is approximately zero.

27. The method of claim 23, wherein the selection step further comprises the step of:
- selecting the lasing wavelength to compensate for temperature dependence of laser components.

28. The method of claim 23, further comprising the step of:
- selecting the at least one volumetric Bragg grating mirror for operation of broad emission spectrum lasers at wavelengths that have little or no variation of stimulated emission cross section with temperature.

29. The method of claim 23, further comprising the step of:
- selecting the at least one volumetric Bragg grating mirror for operation of the laser where the temperature dependence of the stimulated emission cross section is used to compensate for temperature dependent changes of internal laser components.

30. A temperature independent laser comprising:
- a lasing device for providing a laser beam having lasing wavelength selected for minimal temperature dependence; and
- at least one volumetric Bragg grating in photo-thermal refractive glass as a laser cavity mirror for constraining the laser emission at the selected wavelength, the volumetric Bragg grating in photo-thermal refractive glass selected for operation of the laser where the temperature dependence of the stimulated emission cross section is used to compensate for temperature dependent changes the laser, wherein the laser operates over a wide range of temperatures with minimal variation in performance.

31. The laser of claim 30, wherein the at least one volumetric Bragg grating mirror comprises:
- a volumetric Bragg grating in photo-thermal refractive glass selected for operation of the laser where the temperature dependence of the stimulated emission cross section is used to compensate for temperature dependent changes the laser.

32. The laser of claim 30, further comprising:
- a temperature controlled chamber for housing the at least one volume Bragg grating mirror to maintain optimum output coupling with a change in environmental temperatures.

33. A temperature independent laser comprising:
- a lasing device for providing a laser beam having lasing wavelength selected for minimal temperature dependence;
- a volumetric Bragg grating in photo-thermal refractive glass as a laser cavity mirror for constraining the laser emission at the selected wavelength, wherein the laser operates over a wide range of temperatures with minimal variation in performance; and
- a temperature controlled chamber for housing the at least one volume Bragg grating mirror to maintain optimum output coupling with a change in environmental temperatures.

34. The laser of claim 33, wherein the at least one volumetric Bragg grating mirror comprises:
- at least one volumetric Bragg grating mirror selected for operation of broad emission spectrum lasers at wavelengths that have minimum variation of stimulated emission cross section with temperature.

35. The laser of claim 33, wherein the at least one volumetric Bragg grating mirror comprises:
- a volumetric Bragg grating in photo-thermal refractive glass selected for operation of the laser where the temperature dependence of the stimulated emission cross section is used to compensate for temperature dependent changes the laser.

* * * * *

UNITED STATES PATENT AND TRADEMARK OFFICE
CERTIFICATE OF CORRECTION

| | | |
|---|---|---|
| PATENT NO. | : 7,450,626 B1 | Page 1 of 1 |
| APPLICATION NO. | : 11/655495 | |
| DATED | : November 11, 2008 | |
| INVENTOR(S) | : Michael Bass et al. | |

It is certified that error appears in the above-identified patent and that said Letters Patent is hereby corrected as shown below:

On the title page item (75) Inventors should be changed to read:

Michael Bass, Indian River Shores, FL (US);
Alexandra Rapaport, Hem (FR);
Stephan Fahr, Jena (DE);
John Koroshetz, Orlando, FL (US);
Brian Brickeen, Apopka, FL (US)

Signed and Sealed this

Eleventh Day of August, 2009

David J. Kappos
*Director of the United States Patent and Trademark Office*